(No Model.)

L. C. McALLISTER.
NUT LOCK.

No. 246,277. Patented Aug. 23, 1881.

WITNESSES:
W. W. Hollingsworth
Amos W. Hart

INVENTOR:
L. C. McAllister
BY
ATTORNEYS.

UNITED STATES PATENT OFFICE.

LEWIS C. McALLISTER, OF FORT WORTH, TEXAS.

NUT-LOCK.

SPECIFICATION forming part of Letters Patent No. 246,277, dated August 23, 1881.

Application filed February 26, 1881. (No model.)

*To all whom it may concern:*

Be it known that I, LEWIS C. MCALLISTER, of Fort Worth, in the county of Tarrant and State of Texas, have invented a new and useful Improvement in Nut-Locks; and I do hereby declare that the following is a full, clear, and exact description of the same.

My invention is an improvement in the class of nut-locks or devices for preventing nuts from turning off screw-bolts, (by the effect of jars or concussions,) in which the small end of the bolt is split longitudinally and the divided portions spread apart by a wedge or other suitable means.

In my invention the wedge is notched on each edge, corresponding to the thread of the screw, and made of the same width as the diameter of the latter, so that the wire employed for fastening the wedge in place will engage or lie in the notches, as hereinafter described.

Figure 1:
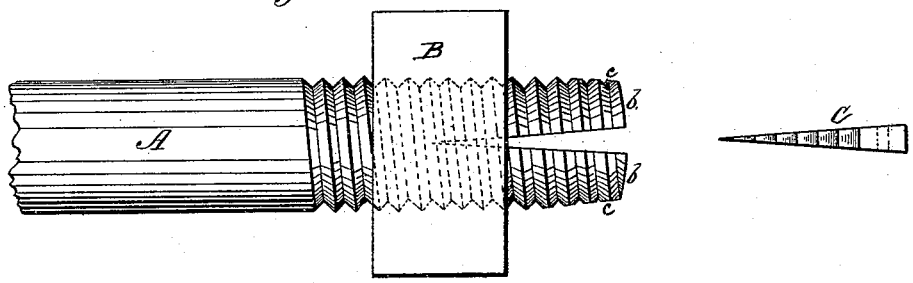
Figure 2:
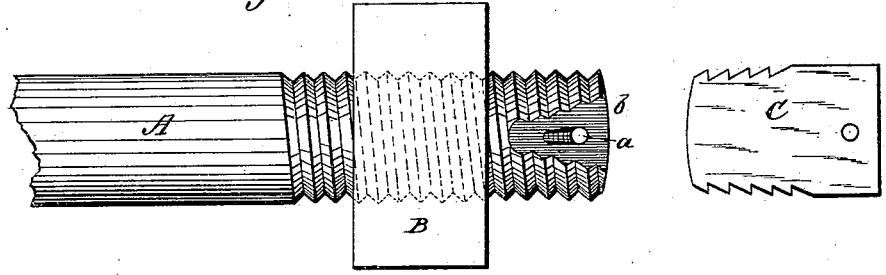
Figure 3:
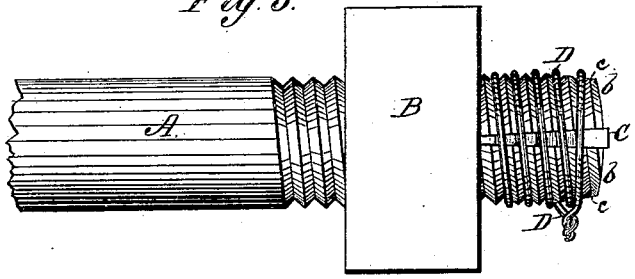
Figure 4:
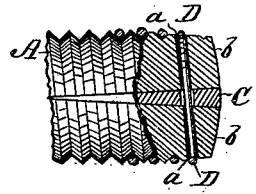
Figure 5:
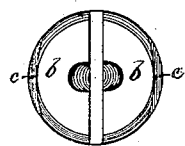

In the accompanying drawings, forming part of this specification, Figures 1 and 2 are different views (plan and side) of a portion of a cleft-bolt, a nut applied thereto, and a wedge, which is detached. Fig. 3 is a plan view of the same parts, showing the wedge inserted and secured by a wire. Fig. 4 is a partly sectional view of the end of the bolt with the wedge inserted. Fig. 5 is an end view of the bolt.

The threaded bolt A is of the kind in common use for various purposes, and particularly for securing the fish-plates of railroad-rails. Its small end is split lengthwise and centrally, and a hole, *a*, is formed transversely in each end of the two divided portions *b b*. After the nut B has been applied to the bolt A and screwed home, as shown, a wedge, C, having notches in its thin side edges, is inserted in the cleft of the bolt in alignment with its axis and driven in, Fig. 3, far enough to cause its inner end to enter the nut B, whereby the divided portions *b b* are slightly separated, thus producing a wedging action in the nut, which greatly increases its friction with the bolt, and hence prevents it from turning on the latter in consequence of jars or concussion. To secure the wedge C in position I apply the wire D, Figs. 3 and 4, which is shown inserted through the holes *a a* in the cleft ends of the bolt A and also through a hole in the head of the wedge, and wrapped around the bolt so as to lie in the thread thereof, and its ends then twisted together to secure it firmly. Said wire may, if preferred, be put through the holes *a* in the bolt before the wedge C is driven; or, instead of passing it through the holes, it may be simply wound around the bolt and wedge, and its ends twisted together, so as to secure it tightly in the spiral groove. The wedge being made of the same width as the diameter of the bolt, and its side edges notched or serrated, the wire traverses and lies in the serrations, and thus holds the wedge immovable either endwise or laterally.

I am aware that narrow wedges have been secured in the cleft of screw-bolts by means of pins inserted through coincident holes in the two parts; but such construction and combination I do not claim.

What I do claim is—

The combination, with the end-cleft screw-bolt, of the wedge which is made of the same width as the diameter of the bolt, and provided with serrations corresponding to the screw-thread, and the fastening-wire which is wrapped around both bolt and wedge and lies in their respective grooves and serrations, as shown and described.

LEWIS CAMPBELL MCALLISTER.

Witnesses:
BARZILLIA P. STACY,
FRANCIS AUSTIN.